US005813108A

United States Patent [19]

Ryan

[11] Patent Number: 5,813,108
[45] Date of Patent: Sep. 29, 1998

[54] TERMINAL INSERTION MACHINE HAVING IMPROVED SHEARING MECHANISM

[75] Inventor: Dale Robert Ryan, Harrisburg, Pa.

[73] Assignee: The Whitaker Corporation, Wilmington, Del.

[21] Appl. No.: 749,862

[22] Filed: Nov. 15, 1996

[51] Int. Cl.[6] .......... B23P 23/00

[52] U.S. Cl. .......... 29/564.6; 29/566.2; 29/825; 29/837

[58] Field of Search .......... 29/33 M, 566.1, 29/566.2, 566.3, 564.6, 564.7, 825, 837

[56] References Cited

U.S. PATENT DOCUMENTS

| | | | |
|---|---|---|---|
| 3,820,218 | 6/1974 | Serrano | 29/566.2 |
| 4,051,593 | 10/1977 | Mori et al. | 29/564.4 |
| 4,176,448 | 12/1979 | Zahn et al. | 29/626 |
| 4,177,549 | 12/1979 | Mori et al. | 29/566.2 |
| 4,177,554 | 12/1979 | Deveres et al. | 29/564.6 |
| 4,294,000 | 10/1981 | Takahashi et al. | 29/566.2 |
| 4,551,901 | 11/1985 | Bonifanti et al. | 29/566.2 |
| 4,598,471 | 7/1986 | Elsbree, Jr. et al. | 29/564.6 |
| 4,612,700 | 9/1986 | Loomis et al. | 29/566.2 |
| 4,718,162 | 1/1988 | Schuppert, Jr. et al. | 29/741 |
| 5,074,033 | 12/1991 | Dassance et al. | 29/566.2 |
| 5,319,842 | 6/1994 | Buckley et al. | 29/566.2 |

OTHER PUBLICATIONS

AMP Incorporated, AMP* Comp–U–Sertor Machines 122330–and 122330–2, Customer Manual, 20 Jun. 95 Rev 0, pp. 3 of 33—33 of 33.

AMP Incorporated, Harrisburg, PA 17105, AMP* .058 Pin Insertion Head 804908–1, Customer Manual, Oct. 1982, pp. CM 5506 REV B iii–vi, CM 55–6 REV B 1–32.

*Primary Examiner*—Daniel W. Howell
*Assistant Examiner*—Christopher Kirkman
*Attorney, Agent, or Firm*—Marshall E. Rosenberg

[57] ABSTRACT

A machine (10) is disclosed for inserting terminals (22) into a substrate (14). The machine (10) includes an insertion head (90) having an improved mechanism for shearing the terminal (22) from its carrier strip (26). The shearing mechanism includes a die (124) and opposing punch (130) arranged to cooperatively engage the terminal to sever it from its carrier strip. A pair of pivoting cam arms (154), each having a die side cam surface (164) and a punch side cam surface (166), are arranged to move the die (124) and punch (130) into shearing engagement with the terminal upon pivoting of the two cam arms. A pair of followers (168, 170) are in following engagement with the die side and punch side cam surfaces (164, 166) so that when the followers are moved vertically by a linear actuator (184), the followers cause the cam arms to pivot.

31 Claims, 9 Drawing Sheets

TERMINAL INSERTION MACHINE HAVING IMPROVED SHEARING MECHANISM

The present invention relates to machines for inserting terminals into a substrate and more particularly to such machines having an improved mechanism for shearing the terminal from its carrier strip.

BACKGROUND OF THE INVENTION

Terminal insertion machines of the type to which the present invention is addressed, receive terminals that are attached to a carrier strip, sever each terminal from the carrier strip, and insert it into a respective hole in a substrate, clinching the terminal in place. The severing and insertion mechanisms for these machines are very complex and expensive to manufacture and maintain. An example of such a terminal insertion machine is shown in FIG. 1 and identified as 10. These machines typically have an X-Y table 12 for holding and positioning a substrate 14 during insertion of the terminals. A terminal severing and insertion head 16 is supported by an arm 18 that extends from the frame of the machine. A reel 20 of terminals is arranged so that the strip of terminals can be fed into the terminal insertion head 16 where they are severed from the carrier strip and inserted into holes in the substrate 14. A control console 21 is used by the operator to control the operation of the machine. A typical terminal 22 is shown in FIG. 4 already in place in a hole in the substrate 14, the underside being crimped at 24. The carrier strip 26 from which the terminal was severed is shown in phantom lines in FIG. 4. Another terminal 28 of a different type and its carrier strip 30 are shown in FIG. 5 to illustrate the wide variety of different terminals that must be accommodated by the machine 10. This terminal has the shape of a relatively thin blade and is substantially larger that the terminal 22 thereby requiring a different severing and insertion mechanism. The terminal insertion head 16 is shown as an assembly in FIG. 2 and in exploded parts form in FIG. 3. In the interest of clarity, only the functional parts pertinent to the present invention will be described. The insertion head 16 has a frame 32, a terminal gripping and inserting mechanism 34, and a die assembly 36 and mating punch assembly 38 for severing the terminal 22 from its carrier strip 26. The carrier strip and terminals are fed into the insertion head along a path indicated by the arrow 40 in FIGS. 2 and 3. The die and punch assemblies 36 and 38 slide back and forth in guideways 42 and 44, respectively, and are operated by left and right pivoting drive links 46 and 48, respectively. Each drive link has a cutout 50, as best seen in FIG. 3, that drivingly engages a pin 52 that extends across an opening in each respective die and punch assembly. As the drive links pivot toward each other the die and punch assemblies move toward each other and into shearing engagement with the terminal 22 and carrier strip 26. The drive links 46 and 48 are pivoted by means of two arms 54 and 56 that are rigidly attached to the drive links through a sleeve 58. Each arm 54 and 56 has a cam follower 60 and 62, respectively, that engages a respective left and right cam track 64 and 66 of a cam 68. A cylinder 70 has its piston rod 72 coupled to the cam 68 so that when the piston rod is retracted the cam is raised, pivoting the arms 54 and 56 and drive links 46 and 48 and thereby moving the die and punch assemblies 36 and 38 toward each other to sever the terminal 22 from the carrier strip 26. The two cam tracks 64 and 66 are mutually offset so that the arm 54 pivots to move the die assembly 36 into position to support the terminal prior to pivotal movement of the arm 56. While the die assembly is moving into position a terminal feed mechanism 74 advances the carrier strip 26 so that the next terminal 22 moves into supporting position on the die assembly 36. The accuracy requirement of the product requires that the cam 68 be manufactured to very close tolerances. Additionally, the cam 68 is very complex having two highly accurate but different cam tracks that are interrelated making it and the entire insertion head expensive to manufacture and to maintain.

What is needed is a terminal severing and insertion head having a simplified terminal shearing mechanism that can accommodate a variety of types of terminals and that is relatively inexpensive to manufacture and to maintain.

SUMMARY OF THE INVENTION

A machine is disclosed for severing a terminal from a carrier strip and inserting the terminal into an opening in a substrate. A terminal shearing unit is provided for performing the severing operation and includes a die assembly having a die, and opposing punch assembly having a punch. The die and punch are arranged to cooperatively engage and sever the terminal from the carrier strip. A first arm is pivotally attached to the frame at a first pivot and is coupled to the die assembly for moving the die in a first direction toward the punch upon pivoting the first arm in a first rotational direction. The first arm includes a first cam surface along an edge thereof. A second arm is pivotally attached to the frame at a second pivot and is coupled to the punch assembly for moving the punch in a second direction toward the die upon pivoting the second arm in a second rotational direction. The second arm includes a second cam surface along an edge thereof that is of different shape than that of the first cam surface. A follower means is provided that is in engagement with both the first and second cam surfaces. The follower means is arranged to move in a first linear direction so that it tracks along the first and second cam surfaces thereby causing the first and second arms to pivot in the first and second rotational directions, respectively, thereby causing the die and punch to move into severing engagement with the terminal.

DESCRIPTION OF THE PREFERRED EMBODIMENT

Figure 1:
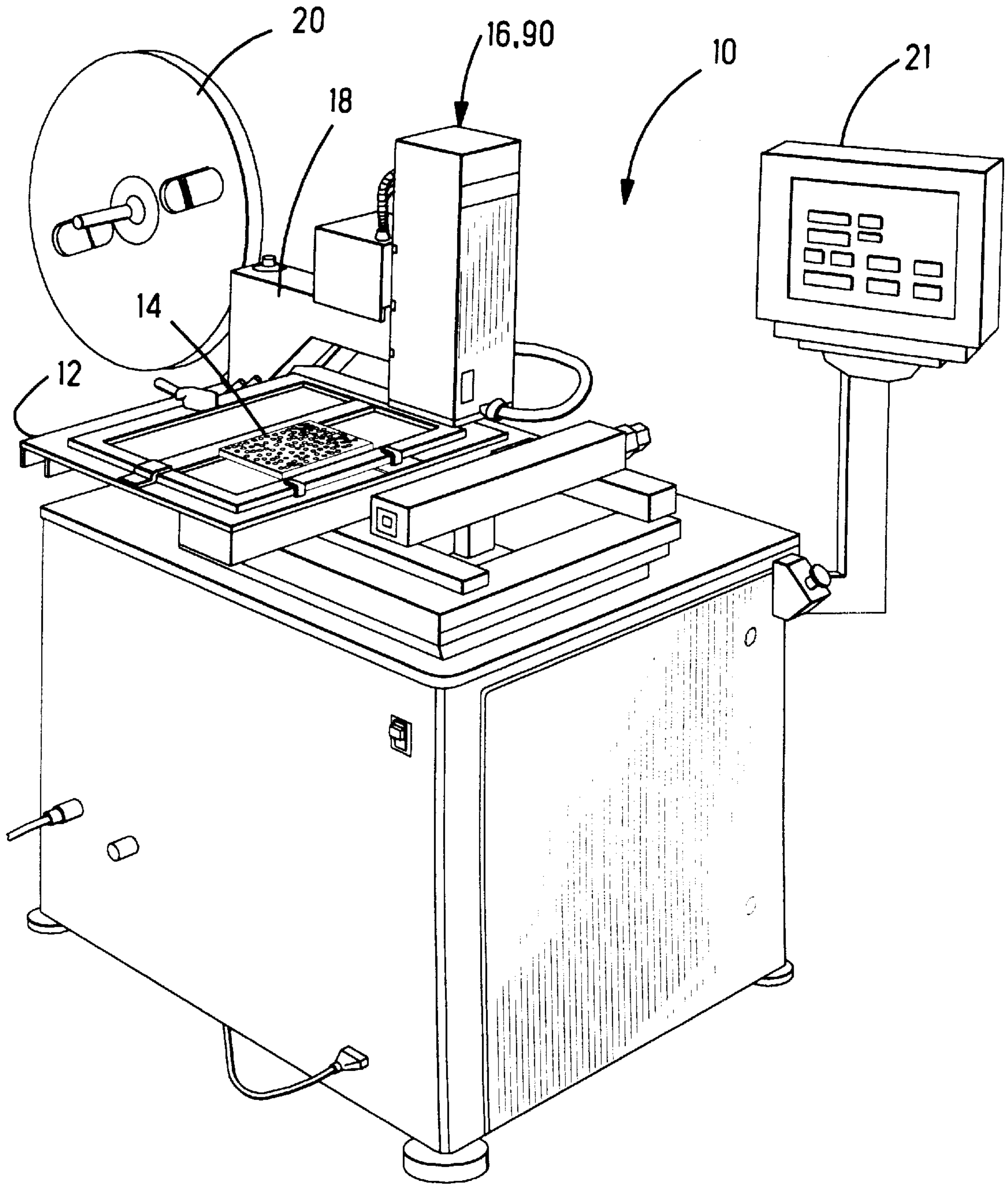
FIG. 1 is an isometric view of a terminating machine of the type to which the present invention relates.
Figure 2:
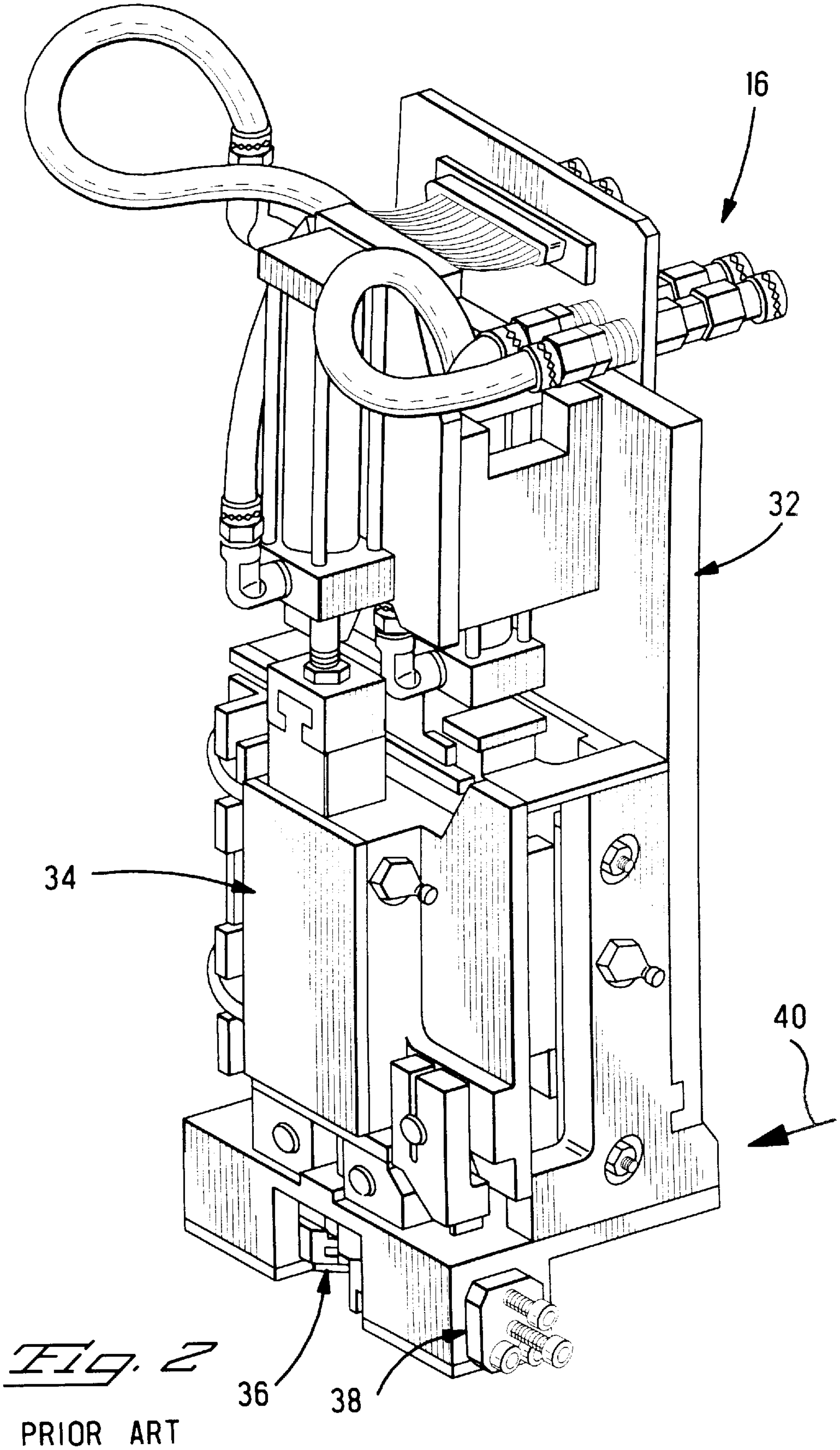
Fig. 2 PRIOR ART
FIG. 2 is an isometric view of a prior art terminal severing and insertion head of the type that is used on the machine shown in FIG. 1.
Figure 6:
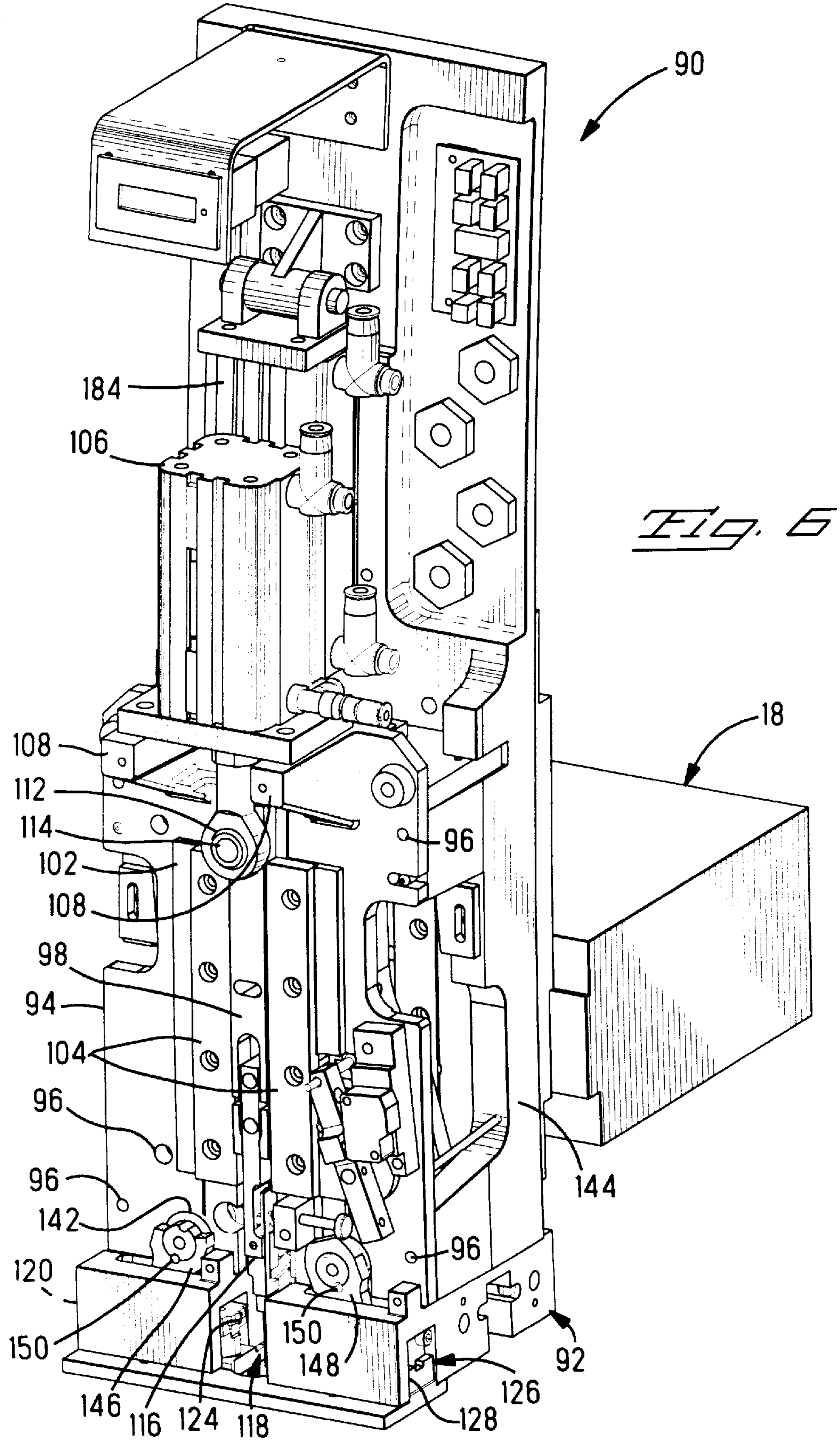
FIG. 6 is an isometric view of a terminal shearing and insertion head incorporating the teachings of the present invention.

There is shown in FIG. 6 a terminal shearing and insertion head 90 having a frame 92 that is coupled to the support arm 18 of the machine 10, as shown in FIG. 1, for receiving a strip of terminals from the reel 20, severing each terminal 22 from the carrier strip 26, and inserting the terminal into a selected hole in the substrate 14. A front plate 94 is attached to the frame 92 by means of screws 96 that extend through holes in the front plate and into threaded holes in the frame, thereby forming a box structure to support the terminal feed and shearing mechanisms, as will be described. A terminal insertion mechanism 98 is slidingly coupled to the front plate, as best seen in FIG. 6, and is free to slide vertically along ways 100. A slide plate 102 and a pair of gibs 104, best seen in FIG. 6, are attached to the front plate 94 and engage the ways 100 to guide the insertion mechanism 98 and to retain it in engagement with the front plate. An air cylinder 106 is attached to a pair of brackets 108 that are rigidly attached to the front plate 94. The cylinder 106 includes a piston rod 110 having a coupling 112 attached to its end that is coupled to the insertion mechanism 98 by means of a pin 114. The insertion mechanism 98 includes a gripper 116 for holding the terminal within a work station 118 after severing from the carrier strip and for inserting the terminal into the substrate.

Figure 8:
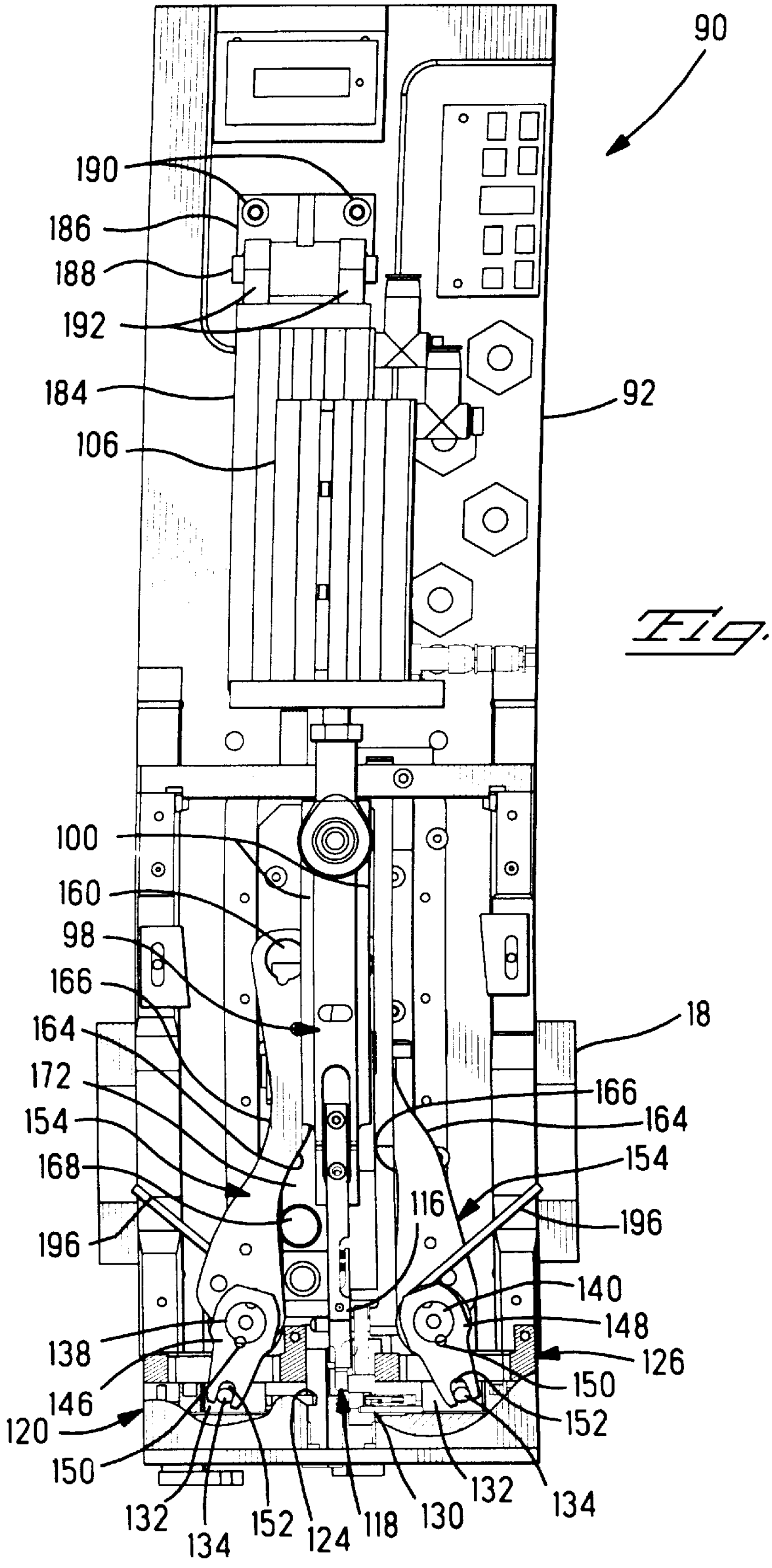
FIGS. 8 and 9 are front and left side views, respectively, of the insertion head shown in FIG. 7.
Figure 9:
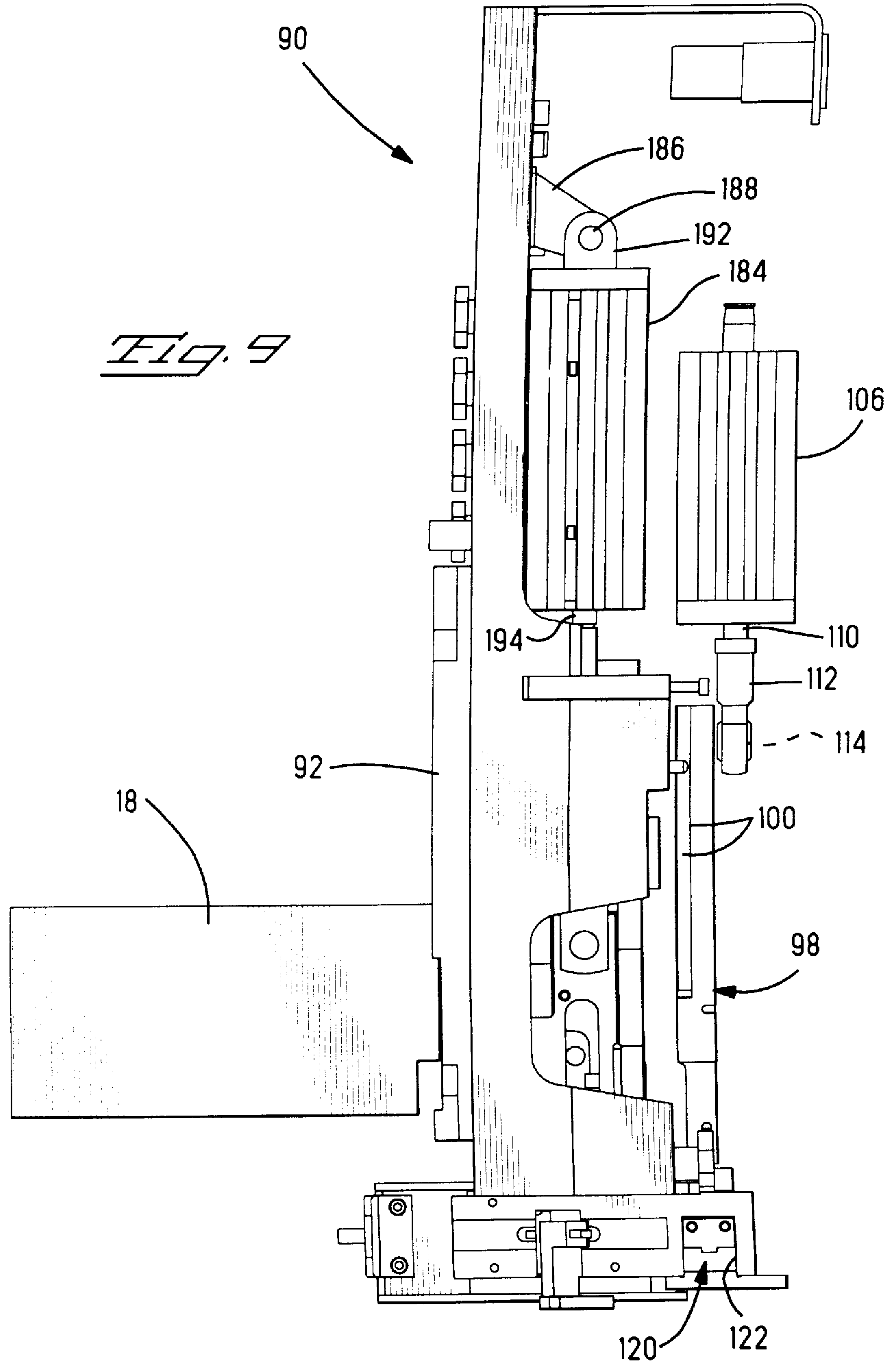

A die assembly 120 is disposed in a left guideway 122 formed in the bottom of the frame 92, as best seen in FIG. 9, and included a die 124, shown in FIG. 8, that is free to slide toward and away from the work station 118. A punch assembly 126, shown in FIG. 6, is disposed in a right guideway 128 formed in the bottom of the frame opposite the left guideway 122, as best seen in FIG. 6. The punch assembly includes a punch 130 that is free to slide toward and into terminal shearing engagement with the die 124 in the work station 118, and away therefrom. Each of the die and punch assemblies 120 and 126, respectively, includes a cutout 132 and a pin 134 that extends through the assembly and spans the cutout. A left shaft 138 and a right shaft 140 are disposed mutually parallel within the frame 92 and are arranged to pivot in bearings 142 that are pressed in the back wall 144 of the frame, not shown, and in the front plate 94, as best seen in FIG. 6. Left and right drive arms 146 and 148 are keyed to the left and right shafts, respectively, by means of pins 150 that are a light press fit in holes formed partly in the shafts and partly in the drive arms, as shown in FIG. 8. That is, the holes are formed axially with respect to the shafts at the intersection of the outer diameter of the shafts and the inner diameter of the drive arms. The free end of each of the left and right drive arms 146 and 148 includes an open ended slot 152 within which the pin 134 rides so that as the shafts 138 and 140 are turned counterclockwise and clockwise, respectively, the left and right drive arms 146 and 148 cause the die and punch assemblies 120 and 126 to move toward each other to a closed position in shearing engagement with the strip of terminals in the work station 118. When the shafts 138 and 140 are turned in the opposite directions the die and punch assemblies are caused to move away from each other to an open position shown in FIG. 8.

Figure 10:
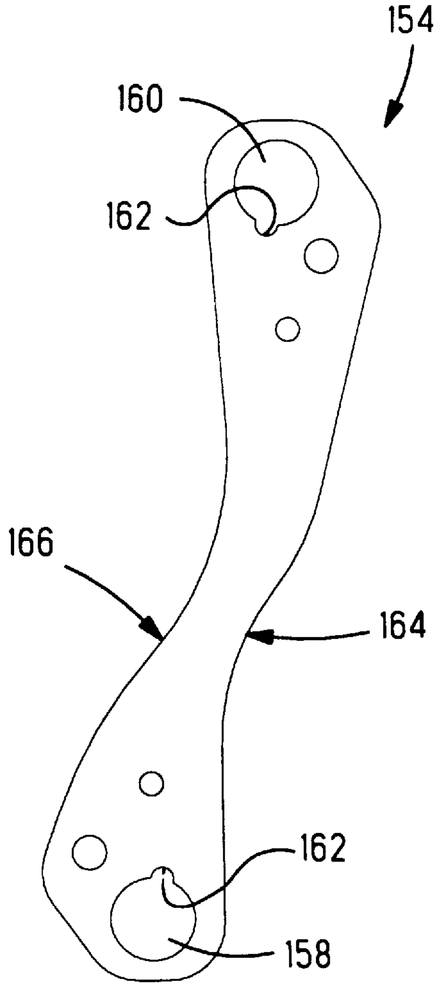
FIGS. 10 and 11 are front and side views of the shear cam as shown in the left position in FIG. 8.
Figure 11:
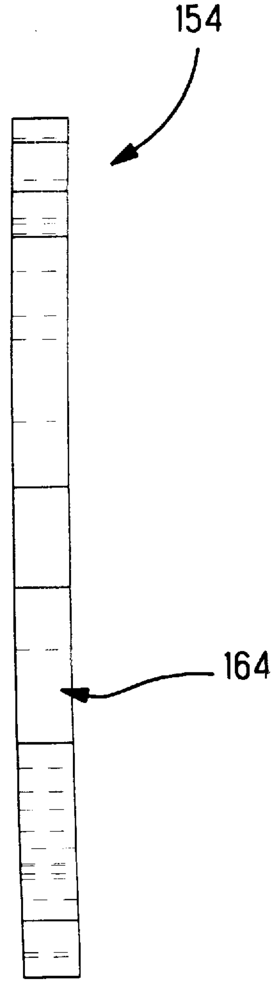
Figure 7:
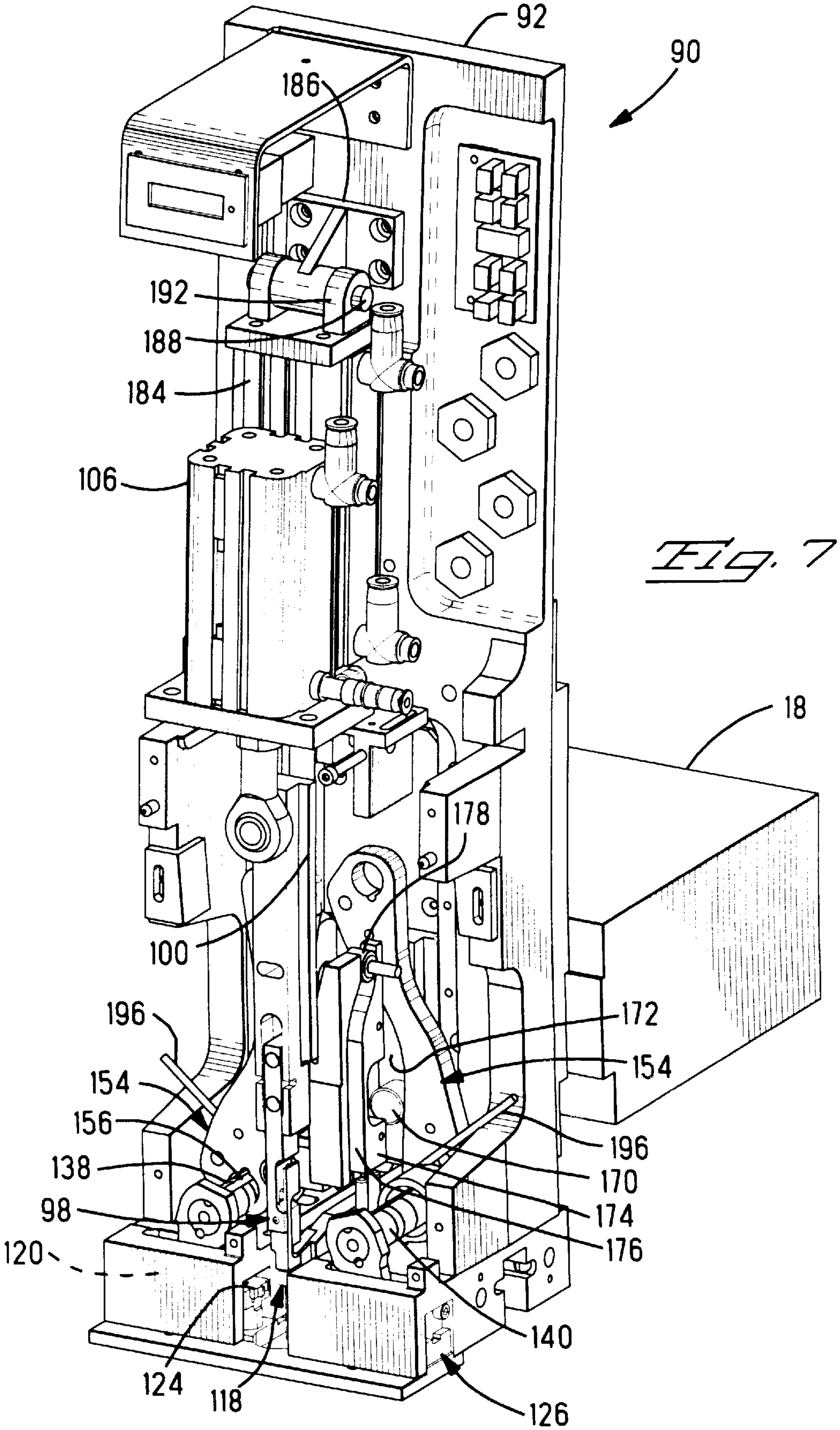
FIG. 7 is a view similar to that of FIG. 6 with the front plate removed.
Figure 12:
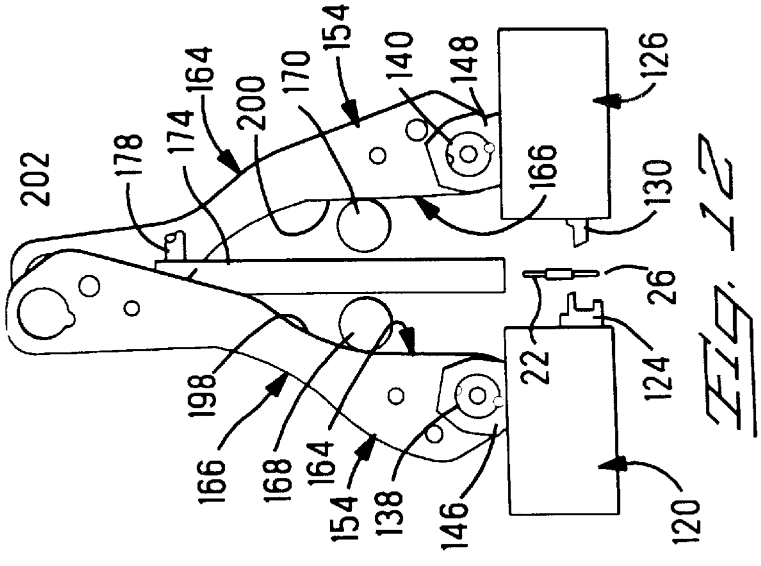

A pair of identical cam arms 154 are keyed to the left and right shafts 138 and 140, one cam arm being keyed to each shaft by means of pins 156 as shown in FIG. 7, in a manner similar to the keying of the drive arms 146 and 148. The cam arm 154, as best seen in FIGS. 10, 11, and 12, is elongated having a hole 158 adjacent one end thereof and another hole 160 adjacent the other end thereof. The holes 158 and 160 are a slip fit with the left and right shafts 138 and 140, respectively. A portion 162 of a hole intersects each wall of the holes 158 and 160 for receipt of the keying pins 156 as set forth above. The cam arm 154 includes a die side cam surface 164 and a punch side cam surface 166, both of which extend substantially the entire length of the elongated cam arm. Left and right cam followers 168 and 170, shown in FIGS. 8 and 7 respectively, are in following engagement with the die side and punch side cam surfaces 164 and 166, respectively. The two cam arms 154 are arranged so that the left one has the left shaft 138 extending through the hole 158 and the die side cam surface 164 in engagement with the left cam follower 168, and the right one has the right shaft extending through the hole 160 and the punch side cam surface 166 in engagement with the right cam follower 170. Since the two cam arms 154 are identical, when the cam surfaces 164 and 166 become worn, the two cam arms can be switched simply by removing each cam arm from its shaft, turning it 180 degrees, and installing it on the opposite shaft. This, of course, provides a substantial cost reduction in the maintenance of the insertion head 90.

The left and right cam followers are attached to and carried by a slide member 172 that is slidingly coupled to the frame 92 so that the slide member can move vertically, as viewed in FIG. 8. A feed cam 174 having a cam track 176 is also attached to and carried by the slide member 172. A follower 178 is in following engagement with the cam track 176 and is arranged to actuate a terminal strip feed mechanism, not shown, that is similar to the feed mechanism 74 shown in FIG. 3. An air cylinder 184 is pivotally coupled to the frame 92 by means of a mounting bracket 186 that is attached to the frame by screws 190 and a pin 198 that extends through the bracket and a pair of spaced flanges 192 that extend from the cylinder, as shown in FIG. 8. The cylinder 184 includes a piston rod 194, best shown in FIG. 9, that is coupled to the slide member 172 by means of a coupling that is not shown, but may be any suitable coupling. The cylinder 184 is arranged to move the slide member 172 upwardly or downwardly as the piston rod 194 is retracted or extended, respectively. A torsion spring 196 is disposed around each of the left and right shafts 138 and 140. The torsion springs are arranged to urge the left shaft to rotate clockwise and the right shaft to rotate counterclockwise, as viewed in FIG. 8, and thereby urge the die side cam surface 164 into engagement with left cam follower 168 and urge the punch side cam surface 166 into engagement with the right cam follower 170. As the cylinder 184 moves the slide member 172 upwardly and downwardly the followers 168 and 170 cause the two cam arms 154 to pivot thereby causing their attached shafts 138 and 140 and attached drive arms 146 and 148 to pivot to shear the terminal from its carrier strip.

Figure 14:
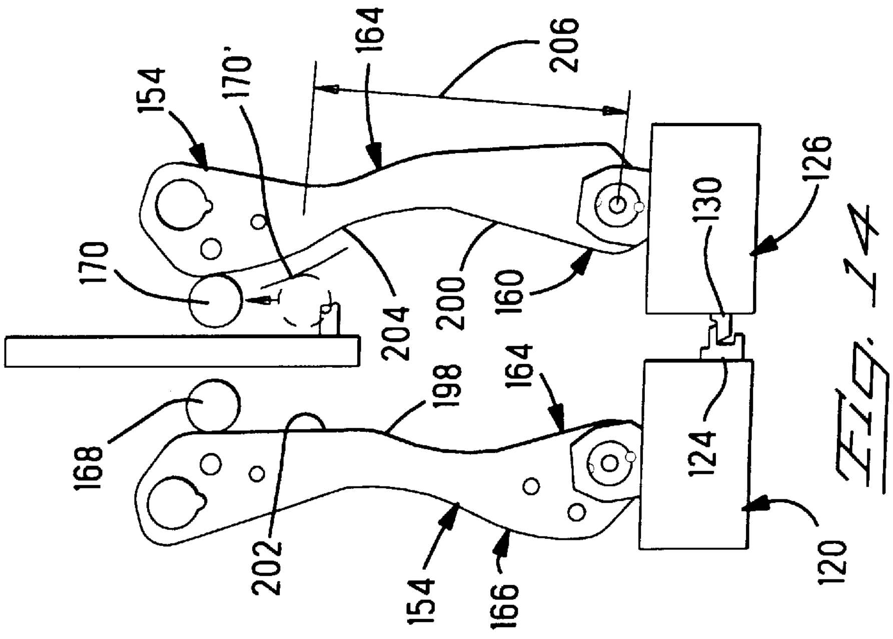
FIGS. 12, 13, and 14 are schematic representations of the terminal shearing mechanism shown in different operating positions.
Figure 13:
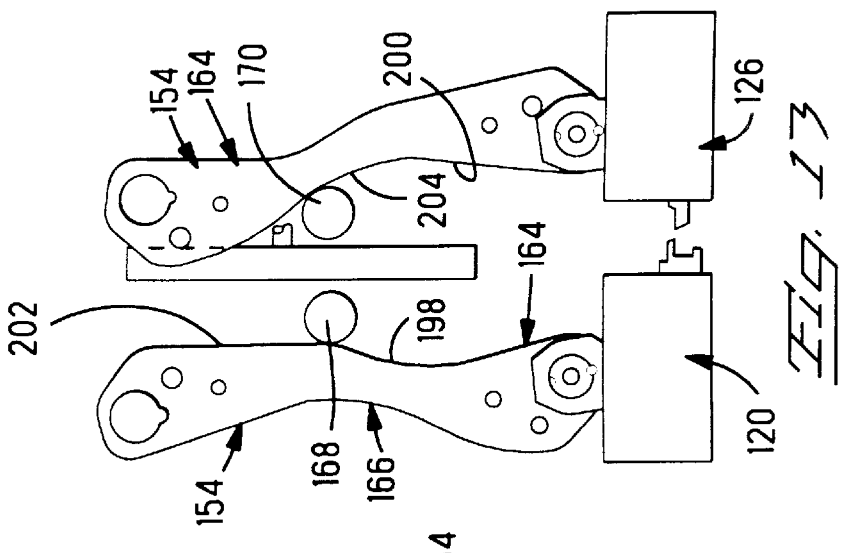

The operation of the shearing mechanism will now be described with reference to FIGS. 12, 13, and 14 which are schematic representations of the shearing mechanism. The mechanism includes two cam arms 154, attached shafts 138 and 140 and drive arms 146 and 148, left and right followers 168 and 170, the die and punch assemblies 120 and 126, and the feed cam and follower 174 and 178, as described above. The die and punch assemblies are shown in FIG. 12 with the die 124 and punch 130 fully retracted to their open positions and the piston rod 194 fully extended, as shown in FIG. 8. A terminal 22, still attached to its carrier strip 26, is ready to be advanced into position between the die 124 and punch 130. The cylinder 184 is then actuated to begin retracting the piston rod 194 thereby moving the slide member 172 upwardly, as viewed in FIGS. 8 and 13. The left and right followers 168 and 170 begin tracking up the cam surfaces 164 and 166, respectively, so that the follower 168 tracks along a cam portion 198 causing the cam arm on the left to begin pivoting counterclockwise while the follower 170 tracks along a dwell cam portion 200 of the cam arm on the right. As this pivoting of the left cam arm continues the die 124 is moved toward the right by the drive arm 146, as viewed in FIG. 12, and the feed cam 174 is moved upwardly along with the slide member thereby advancing the terminal 22. This movement continues until the follower 168 reaches a dwell cam portion 202, at which point the terminal 22 is in position between the die 124 and punch 130 and the die 124 is in its fully rightmost position in supporting engagement with the terminal, as shown in FIG. 13. Note that at this point the follower 170 has begun tracking a cam portion 204 that has slightly pivoted the right cam arm clockwise. As the piston rod 194 continues to move the slide member 172 upwardly, as viewed in FIG. 13, the left follower 168 tracks along the dwell cam portion 202 preventing further movement of the die 124, and the feed follower 178 tracks along a dwell cam portion, not shown, of the feed cam 174 so that the terminal 22 remains in position with respect to the die 124 and advancing punch 130. As the followers 168 and 170 track their respective cam portions 202 and 204 upwardly, the right cam arm continues to pivot clockwise, thereby moving the punch 130 into shearing engagement with the die 124 so that the terminal 22 is severed from its carrier strip 26 and the followers reach the positions shown in FIG. 14. The punch first engages the terminal when the right follower 170 is in the position shown in phantom lines and identified as 170' in FIG. 14, and severs the terminal 22 from the carrier strip 26 as the follower continues to move up to the position shown in solid lines. At this point the piston rod 194 stops and reverses direction so that the followers 168 and 170 move downwardly to their starting positions shown in FIG. 12. The cylinder 106 is then actuated to move the insertion mechanism 98 and severed terminal 22 downwardly until the terminal is inserted into a hole in the substrate and clenched in place in the usual manner. The process is than repeated any desired number of times.

Figure 3:
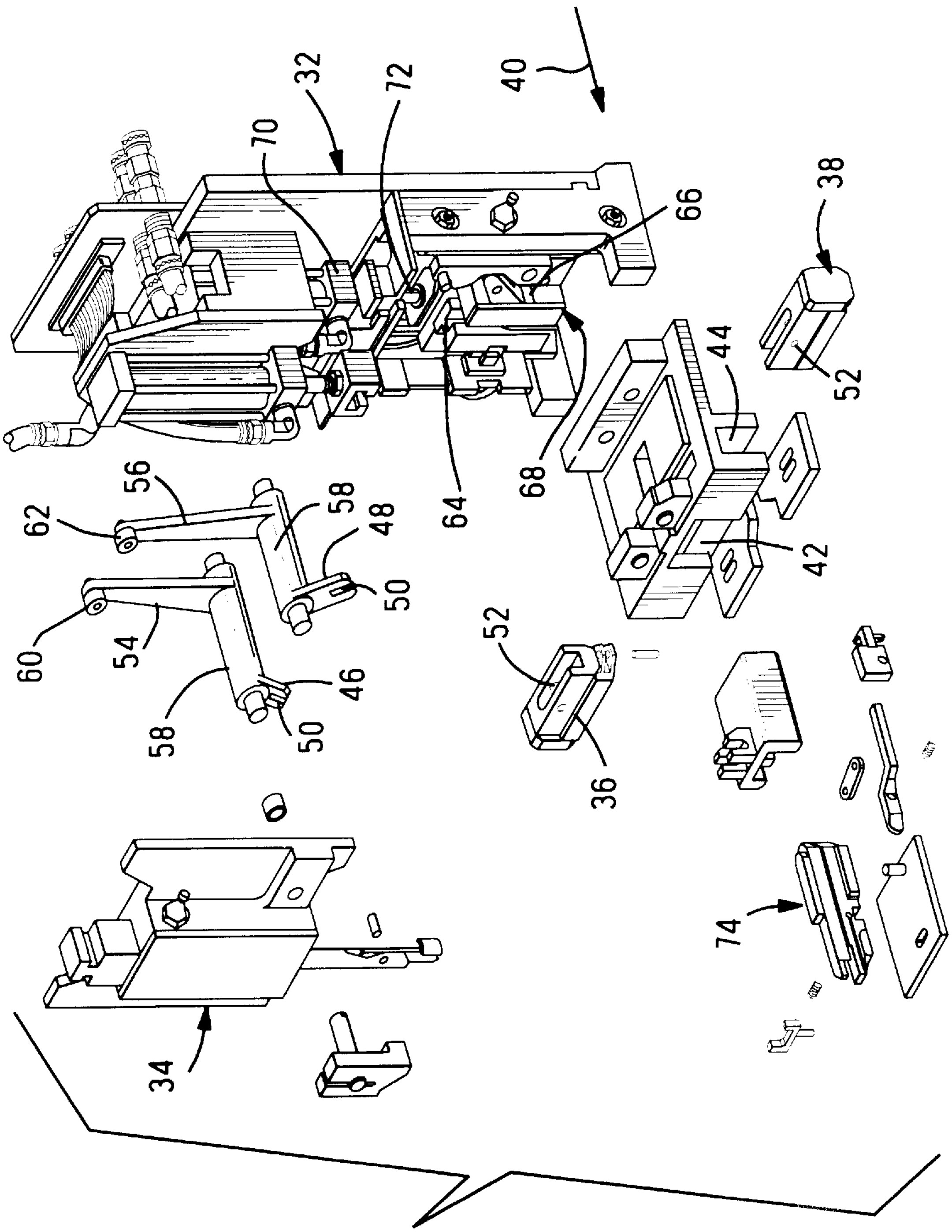
Fig. 3 PRIOR ART
FIG. 3 is an exploded parts view of the terminal insertion head shown in FIG. 2.
Figure 4:
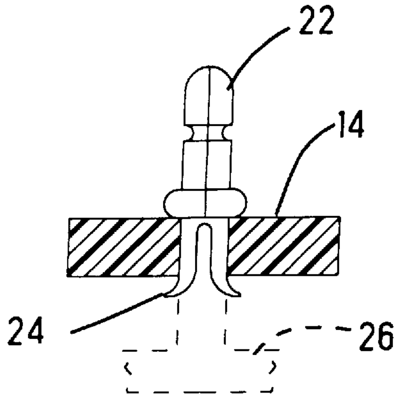
FIG. 4 is a partial cross-sectional view of a substrate showing a terminal crimped in place.
Figure 5:
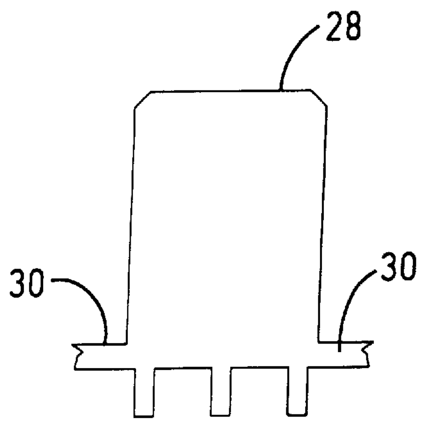
FIG. 5 is a front view of a terminal different than that of FIG. 3.

It will be appreciated by those skilled in the art that as the punch engages the terminal and begins to sever it from its carrier strip, the required force is at a maximum. At the same time, the moment arm of the right cam arm, defined by the distance 206 in FIG. 14, is increasing as the follower 170 moves upwardly thereby providing a mechanical advantage to achieve the necessary force to complete the shearing operation. Conversely, when the followers first begin to move from their positions shown in FIG. 12, the moment arm is relative short. This results in movement of the die 124 with less force as the die is moved into shearing position, as shown in FIG. 13. Therefore, the variable length moment arm provides less force on the shearing components when less force is needed and it provides more force during the actual shearing operation when greater force is needed. This structure has two advantages over the prior art structure where a cam and cam track are moved to pivot a drive arm having a follower in engagement with the cam track, as shown in FIG. 3. The first advantage is that the relatively high shearing forces are easily achieved by the relative long moment arms of the cam arms 154. The second advantage is that the accuracy of the cam surfaces, in particular the portion 202 and 204 which position the die 124 and punch 130 in shearing engagement, may be realized with a relatively wider tolerance because of the long moment arm of the cam arms, as opposed to the relatively short moment of the prior art cam tracks shown in FIG. 3. Another important advantage of the present invention is that the two cam arms 154 are interchangeable, each arm having a die side cam surface 164 and a punch side cam surface 166. This effectively doubles the life of each cam arm thereby providing a cost advantage over the prior art cam 68 which must be discarded when one track is worn beyond acceptable limits. Further, there is a substantial cost advantage in that two identical cam arms 154, that are inexpensive to manufacture, replace the complex and expensive cam 68 having a highly precision cam track 66. However, it will be appreciated by those skilled in the art that the teachings of the present invention may be advantageously practiced with two different cam arms 154, one having only the die side cam surface 164 and the other having only the punch side cam surface 166. A major structural difference in the insertion head 90 of the present invention over the prior art insertion head 16 that helps to achieve these advantages is that, in the present device, the two movable followers 168 and 170 drive the two cam arms 154, while in the prior art device, the movable cam 68 drives the two followers 60 and 62.

I claim:

1. In a machine for severing a terminal from a carrier strip and inserting said terminal into an opening in a substrate, a terminal shearing unit for effecting said severing comprising:

(1) a die assembly having a die, and opposing punch assembly having a punch, said die and punch arranged to cooperatively engage said terminal to effect said severing;

(2) a frame;

(3) a first arm pivotally attached to said frame at a first pivot, said first arm coupled to said die assembly for moving said die toward said punch upon pivoting said first arm in a first rotational direction, said first arm having a first cam surface along an edge thereof;

(4) a second arm pivotally attached to said frame at a second pivot, said second arm coupled to said punch assembly for moving said punch toward said die upon pivoting said second arm in a second rotational direction, said second arm having a second cam surface along an edge thereof that is of different shape than that of said first cam surface; and (5) follower means in engagement with both said first and second cam surfaces and arranged to be moved in a first linear direction so that said follower means tracks along said first and second cam surfaces thereby causing said first and second arms to pivot in said first and second rotational directions, respectively, thereby causing said die and punch to move into said severing engagement with said terminal.

2. The machine according to claim 1 including a first lever coupled to said first arm and extending outwardly from said first pivot into engagement with said die assembly so that when said first arm is pivoted in said first rotational direction said first lever is pivoted in said first rotational direction thereby effecting said movement of said die in said first direction, and including a second lever coupled to said second arm and extending outwardly from said second pivot into engagement with said punch assembly so that when said second arm is pivoted in said second rotational direction said second lever is pivoted in said second rotational direction thereby effecting said movement of said punch toward said die.

3. The machine according to claim 2 wherein said first pivot comprises a first shaft pivotally attached to said frame, and said first arm and said first lever are both rigidly attached to said first shaft, and wherein said second pivot comprises a second shaft pivotally attached to said frame, and said second arm and said second lever are both rigidly attached to said second shaft.

4. The machine according to claim 1 wherein said first arm includes a third cam surface along an edge thereof opposite said first cam surface, said third cam surface being identical in shape to said second cam surface, and wherein said second arm includes a fourth cam surface along an edge thereof opposite said second cam surface, said fourth cam surface being identical in shape to said first cam surface, said first and second arms being interchangeable so that said first arm can be pivotally attached to said frame at said second pivot with said third cam surface in engagement with said follower means and said second arm can be pivotally attached to said frame at said first pivot with said fourth cam surface in engagement with said follower means.

5. The machine according to claim 1 wherein said first and second cam surfaces are arranged so that upon said movement of said follower means in said first linear direction said first arm is made to pivot in said first rotational direction and begin effecting said movement of said die into a position for supporting a said terminal prior to effecting said pivotal movement of said second arm in said second rotational direction.

6. The machine according to claim 5 wherein said first and second cam surfaces are further arranged so that after said die is in said terminal supporting position, continuing movement of said follower means in said first linear direction causes said second arm to pivot in said second rotational direction to effect said movement of said punch into said severing engagement with said terminal while said first arm is prevented from pivoting further in said first rotational direction.

7. The machine according to claim 6 wherein said follower means comprises a slide member slidingly coupled to said frame and first and second follower members projecting from and carried by said slide member in following engagement with said first and second cam surfaces, respectively, and including a linear actuator having a movable armature attached to said slide member for effecting said movement in said first linear direction.

8. The machine according to claim 7 wherein said first and second follower members are rollers journaled for rotation in said slide member.

9. The machine according to claim 7 including a feed cam attached to and carried by said slide member, and a feed follower in following engagement with said feed cam and arranged so that during said movement of said slide member in said first linear direction said feed follower causes said carrier strip of terminals to advance so that a terminal is in supporting engagement with said die when said die is in said terminal supporting position.

10. The machine according to claim 9 wherein said feed follower is further arranged so that said terminal is in said supported engagement prior to completion of said pivoting of said second arm in said second rotational direction.

11. The machine according to claim 1 wherein said first and second rotational directions are opposite directions.

12. The machine according to claim 1 wherein said first and second pivots have first and second pivot axes, respectively, which are mutually parallel.

13. In a machine for severing a terminal from a carrier strip and inserting said terminal into an opening in a substrate, a terminal shearing unit for effecting said severing comprising:

(1) a die assembly having a die, and opposing punch assembly having a punch, said die and punch arranged to cooperatively engage said terminal to effect said severing;

(2) a frame;

(3) a pair of arms each having a first cam surface along an edge thereof and a second cam surface along an opposite edge thereof, a first of said pair of arms is pivotally attached to said frame at a first pivot and a second of said pair of arms is pivotally attached to said frame at a second pivot, wherein said first arm is coupled to said die assembly so that when said first arm is pivoted in a first rotational direction said die is moved toward said punch, and said second arm is coupled to said punch assembly so that when said second arm is pivoted in a second rotational direction said punch is moved toward said die; and (4) follower means in engagement with said first cam surface of said first arm and in engagement with said second cam surface of said second arm, said follower means arranged to move in a first linear direction so that said follower means tracks along said first and second cam surfaces thereby causing said first and second arms to pivot in said first and second rotational directions, respectively, thereby causing said die and punch to move into said severing engagement with said terminal.

14. The machine according to claim 13 wherein said second cam surface is of different shape than that of said first cam surface.

15. The machine according to claim 13 wherein said pair of arms are of substantially identical shape and are interchangeable on said first and second pivots.

16. The machine according to claim 13 wherein said first and second cam surfaces are arranged so that upon said movement of said follower means in said first linear direction said first arm is made to pivot in said first rotational direction and effect said movement of said die toward said punch and into a position for supporting a said terminal prior to completing said pivotal movement of said second arm in said second rotational direction.

17. The machine according to claim 16 wherein said first and second cam surfaces are further arranged so that after said die is in said terminal supporting position, continuing movement of said follower means in said first linear direction causes said second arm to pivot in said second rotational direction to effect said movement of said punch into said severing engagement with said terminal while said first arm is prevented from pivoting further in said first rotational direction.

18. The machine according to claim 17 wherein said follower means comprises a slide member slidingly coupled to said frame and first and second follower members projecting from and carried by said slide member in following engagement with said first and second cam surfaces, respectively, and including a linear actuator having a movable armature attached to said slide member for effecting said movement in said first linear direction.

19. In a machine for severing a terminal from a carrier strip and inserting said terminal into an opening in a substrate, a terminal shearing unit for effecting said severing comprising:

(1) a die assembly having a die, and opposing punch assembly having a punch, said die and punch arranged to cooperatively engage said terminal to effect said severing;

(2) a frame;

(3) a pair of cams pivotally attached to said frame and coupled to said die and punch assemblies so that when said pair of cams are pivoted said die is moved toward said punch and said punch is moved toward said die, into severing engagement with a terminal; and (4) follower means in engagement with each one of said pair of cams, said follower means arranged to move in a first linear direction so that said follower means tracks along an arcuate surface of each one of said pair of cams thereby causing said cams to pivot thereby causing said die and punch to move into said severing engagement with said terminal.

20. A method for severing a terminal from a carrier strip and inserting said terminal into an opening in a substrate, the method comprising:

providing a die assembly having a die, and an opposing punch assembly having a punch, said die and punch arranged to cooperatively engage said terminal to effect said severing;

providing a first arm for pivotal motion, said first arm coupled to said die assembly for moving said die toward said punch upon pivoting said first arm in a first rotational direction, said first arm having a first cam surface along an edge thereof;

providing a second arm for pivotal motion, said second arm coupled to said punch assembly for moving said punch toward said die upon pivoting said second arm in a second rotational direction, said second arm having a second cam surface along an edge thereof that is of different shape than that of said first cam surface; and engaging a follower means with both said first and second cam surfaces when said follower means is moved in a first linear direction so that said follower means tracks along said first and second cam surfaces thereby causing said first and second arms to pivot in said first and second rotational directions, respectively, thereby causing said die and punch to move into said severing engagement with said terminal.

21. The method according to claim 20 the method further comprising:

providing a third cam surface along an edge opposite said first cam surface, said third cam surface being identical in shape to said second cam surface, and providing a fourth cam surface along an edge opposite said second cam surface, said fourth cam surface being identical in shape to said first cam surface, whereby said first and second arms are interchangeable for engagement of said third and fourth cam surfaces with said follower means.

22. The method according to claim 20 the method further comprising:

arranging said first and second cam surfaces so that upon said movement of said follower means in said first linear direction said first arm is made to pivot in said first rotational direction and begin effecting said movement of said die into a position for supporting a said terminal prior to effecting said pivotal movement of said second arm in said second rotational direction.

23. The method according to claim 22 the method further comprising:

arranging said first and second cam surfaces so that after said die is in said terminal supporting position, continuing movement of said follower means in said first linear direction causes said second arm to pivot in said second rotational direction to effect said movement of said punch into said severing engagement with said terminal while said first arm is prevented from pivoting further in said first rotational direction.

24. The method according to claim 23 the method further comprising:

slidingly engaging said first and second follower means with said first and second cam surfaces.

25. The method according to claim 24 the method further comprising:

roller journalling said first and second follower members for rotation in said slide member.

26. The method according to claim 20 the method further comprising:

advancing said carrier strip of terminals when said follower means is moved in said first linear direction so that a terminal is in supporting engagement with said die when said die is in a terminal supporting position.

27. The method according to claim 26 the method further comprising:

supportingly engaging said terminal prior to completion of said pivoting of said second arm in said second rotational direction.

28. The method according to claim 20 wherein said first and second rotational directions are opposite directions.

29. The method according to claim 20 the method further comprising:

providing a pair of arms of substantially identical shape that are interchangeable.

30. The method according to claim 20 the method further comprising:

arranging said first and second cam surfaces so that upon said movement of said follower means in said first linear direction said first arm is made to pivot in said first rotational direction and effect said movement of said die toward said punch and into a position for supporting a said terminal prior to completing said pivotal movement of said second arm in said second rotational direction.

31. A method for severing a terminal from a carrier strip and inserting said terminal into an opening in a substrate, the method comprising:

providing a die assembly having a die, and an opposing punch assembly having a punch, said die and punch arranged to cooperatively engage said terminal to effect said severing;

providing a pair of cams pivotally coupled to said die and punch assemblies so that when said pair of cams are pivoted said die is moved toward said punch and said punch is moved toward said die, into severing engagement with a terminal; and engaging a follower along an arcuate surface of each one of said pair of cams when said follower is moved in a first linear direction so that said follower tracks along each one of said pair of cams thereby causing said cams to pivot thereby causing said die and punch to move into said severing engagement with said terminal.

* * * * *